United States Patent [19]

Mohler

[11] 4,116,073
[45] Sep. 26, 1978

[54] BALANCING SYSTEM

[76] Inventor: Sailor H. Mohler, 5410 Lightning View, Columbia, Md. 21044

[21] Appl. No.: 860,326

[22] Filed: Dec. 14, 1977

[51] Int. Cl.² ............................................. G01M 1/12
[52] U.S. Cl. .................................................... 73/483
[58] Field of Search .................... 73/483–486, 73/487, 66; 356/154, 155; 33/286, 288, DIG. 21

[56] References Cited

U.S. PATENT DOCUMENTS 3,528,748  9/1970  Burch et al. ............... 33/DIG. 21 X

FOREIGN PATENT DOCUMENTS 1,163,406  9/1969  United Kingdom ...................... 73/483
1,238,457  7/1971  United Kingdom ...................... 73/483

Primary Examiner—James J. Gill
Attorney, Agent, or Firm—Morton J. Rosenberg

[57] ABSTRACT

A balancing system for balancing an object mounted thereon in a predetermined plane. The balancing system includes a laser mechanism for producing a coherent first beam of visible electromagnetic radiation in a substantially vertical direction line. A beam splitting member inclinable with respect to the vertical direction line upon imbalance of an object mounted on the balancing system intercepts the first beam of coherent light emitted from the laser. The beam splitting member is adapted to pass the first beam of light external to the balancing system and to reflect a portion of the first beam of light into a second coherent beam of light due to reflected passage within the beam splitting member when the member is inclined with respect to the vertical direction. The first and second beams of light intercept a target area remote from the balancing system and provide a pair of displaced visible light points determining the unbalance of the object mounted on the balancing system. Upon adding weights to the object in appropriate areas, the first and second beams of light become coincident each with respect to the other, thus defining a balanced condition of the object.

12 Claims, 2 Drawing Figures

BALANCING SYSTEM

BACKGROUND OF THE INVENTION

1. Field of the Invention

This invention pertains to balancing systems for balancing an object in a particular plane. This invention relates to a balancing system particularly adaptable to the balancing of tires. In particular, this invention relates to balancing systems utilizing optical techniques. Still further, this invention relates to balancing systems utilizing lasers in combination with beam splitting members to produce at least two points of light on a target area when the object being balanced is inclined with respect to a predetermined plane.

2. Prior Art

Balancing systems for balancing objects in a predetermined plane have been known in the art. Additionally, balancing systems for balancing tires are well-known in the prior art. In general, prior balancing systems are of the dynamic or static balancing type.

Dynamic balancing systems where the object to be balanced is rotated at generally high speed, do provide for increased accuracy in balancing tires or other objects. However, such dynamic balancing systems are extremely costly and include complex hardware as well as electric circuitry to provide the necessary balancing information. The complexity of such prior dynamic systems is correspondingly increased and further provides for increased labor costs due to the level of technical expertise which must be utilized in the operation of such dynamic balancing systems.

Some prior art balancing systems are static in nature, however, such static prior art balancing systems generally utilize bubble level techniques to adjust the balancing of tires mounted thereon. Such level techniques do not provide for high accuracy in the balancing of the objects mounted thereon. Such systems are generally of lower cost than the dynamic balancing systems, however, the inaccuracies may have deleterious effects when the object is placed in usage.

SUMMARY OF THE INVENTION

A balancing system for balancing an object about a vertically directed axis line which includes a housing adapted to be levelled on a base surface defining a plane substantially normal to the vertical axis line. A balancing head is displaceably mounted on the housing with the object being releasably mounted to an external surface of the balancing head. A light emission system is secured to the housing and the balancing head for passing at least a first coherent beam of light substantially coincident to the vertical axis line as well as a second coherent beam of light displaced from the first beam of light responsive to an unbalanced condition of the object about the vertical axis line.

DESCRIPTION OF THE PREFERRED EMBODIMENTS

Figure 1:
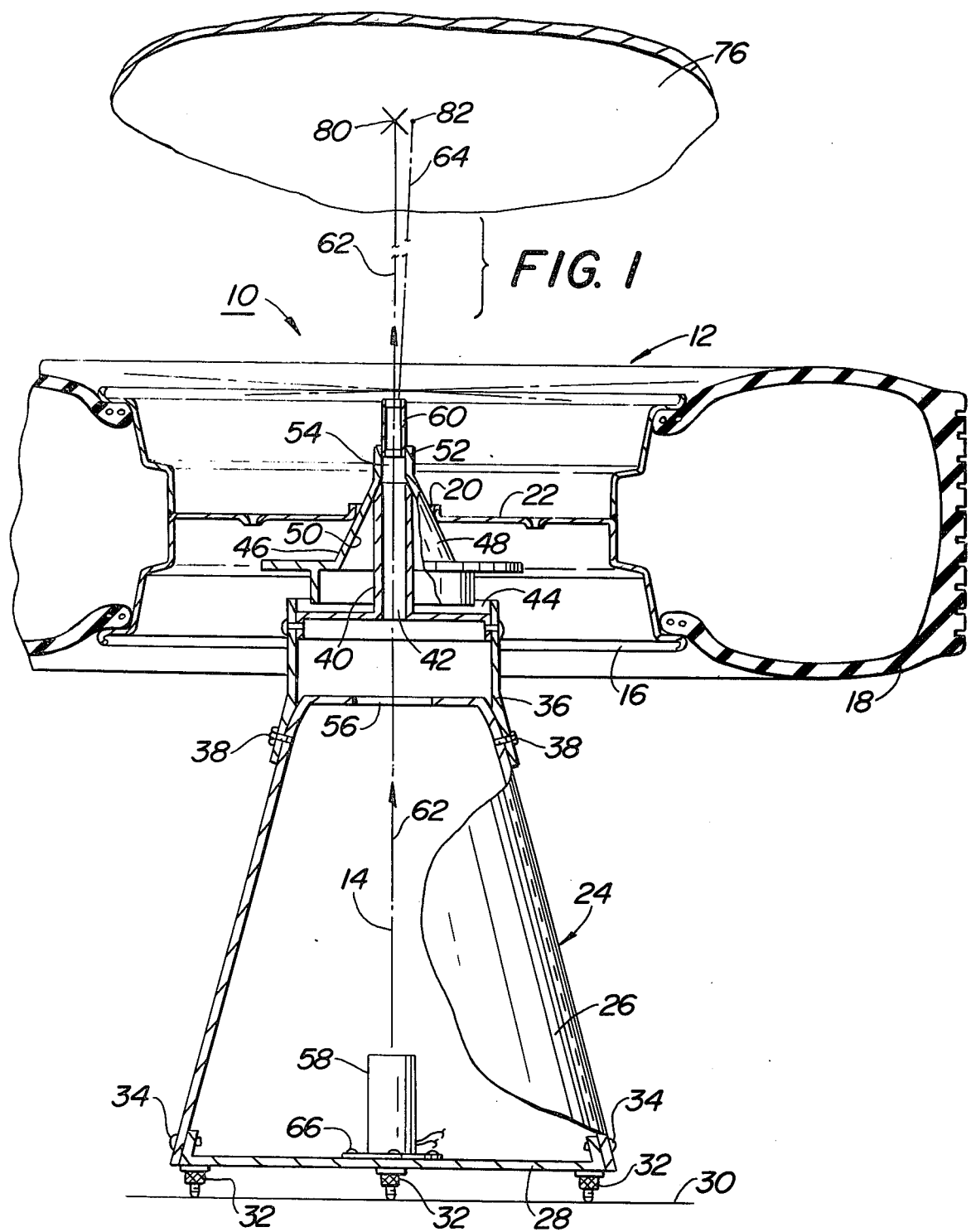
FIG. 1 is an elevation view partially cut away of the balancing system showing a tire mounted on the balancing system; and, FIG. 2 is a schematic diagram of the essential elements of the balancing system showing the path of displaced beams of light responsive to an inclination of the object with respect to a predetermined plane.
Figure 2:
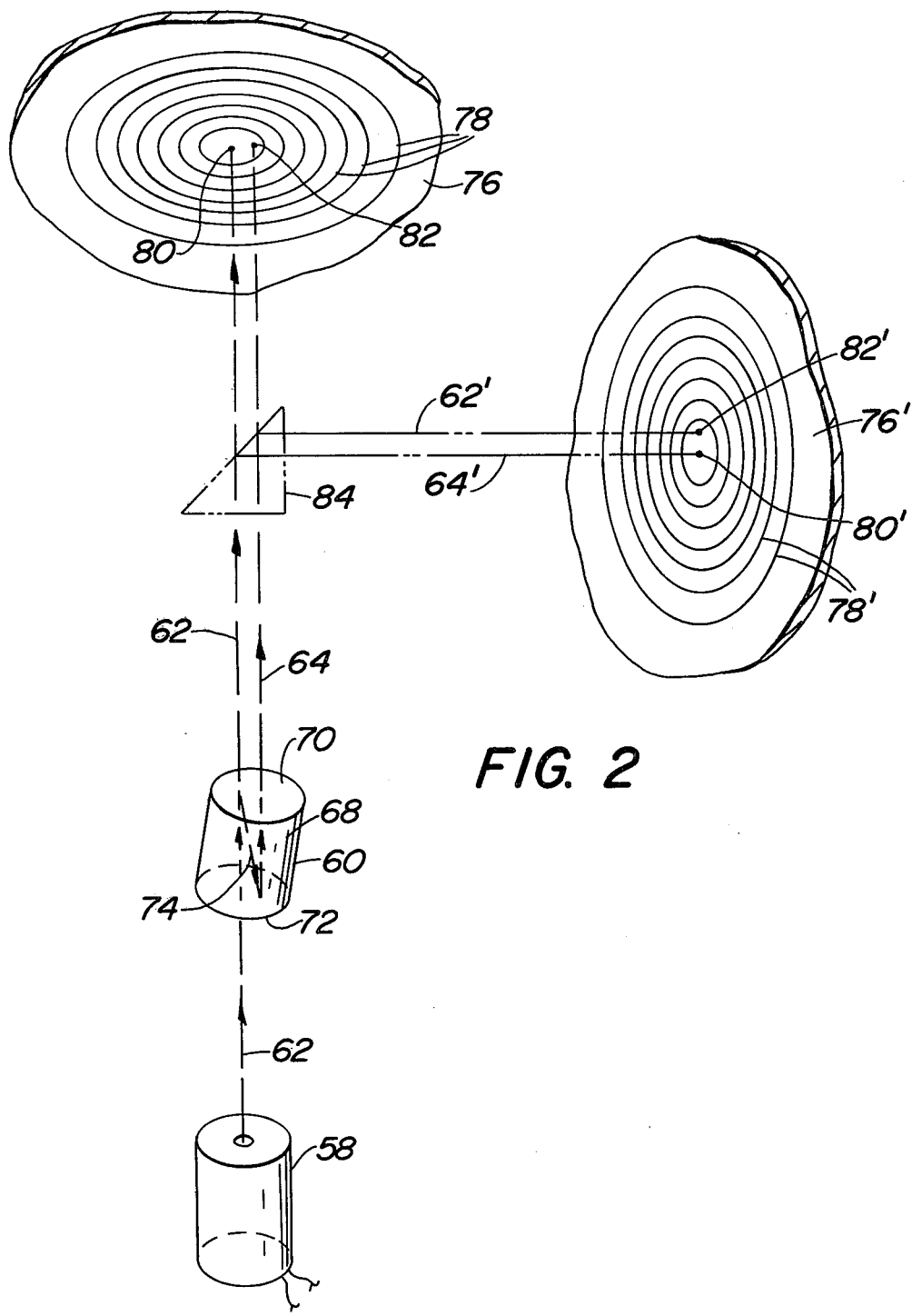

Referring now to FIGS. 1 and 2, there is shown balancing system 10 for balancing object 12 in a horizontal plane defined by substantially vertically directed axis line 14 passing normal to the horizontal plane. In particular, object 12 may include a tire system formed of tire wheel 16 and tire member 18 adapted to be mounted on balancing system 10 through central tire opening 20 formed in tire frame member 22. As will be seen in following paragraphs, balancing system 10 provides the user with the ability to utilize static balancing concepts while providing for increased accuracy in balancing tire 12 about vertically directed axis line 14. Use of static balancing concepts and systems allows the user to achieve accuracies only found in dynamic balancing systems while simultaneously having a system at hand which may have a cost effectiveness of approximately an order of magnitude over the dynamic balancing systems. Still further, this high degree of balancing accuracy may be achieved by use of non-complex static balancing elements having an increased work life utilization period when taken with respect to such dynamic balancing systems. Still further, balancing system 10 provides the operator or user with a system which is simple to read and operate for purposes of efficient operator time utilization.

Balancing system 10 includes housing 24 having housing side walls 26 and housing base 28 adapted to be levelled on base surface 30 which defines the horizontal plane substantially normal to vertical axis line 14.

In order to balance housing 24 in a manner such that housing base 28 defines a plane substantially parallel to base surface 30, levelling screws 32 defining adjustable feet are secured in displaceable manner to housing base 28. Levelling screws 32 or some like levelling technique may be used in a tripod type arrangement on a lower surface of housing base 28. The particular manner and system of levelling housing base 28 with respect to base surface 30 is not important to the inventive concept as is herein defined, with the except that at the termination of the levelling process, that base surface 30 of housing 24 is substantially parallel to base surface 30. Additionally, housing base 28 may be mounted to housing side walls 26 through bolts 34 or some like securement technique. Housing side walls 26 may be in closed contour or formed in a frame like manner sufficient to give rigidity to overall balancing system 10.

Reservoir member 36 is mounted in secured fashion through reservoir bolts or screws 38 to an upper portion of housing 24. Reservoir member 36 is generally cup-shaped in contour and adapted for insertion of fulcrum member 40 which is secured to housing 24. Fulcrum member 40 extends in the vertical direction defined by vertical axis line 14 and includes fulcrum through opening 42 passing in vertical direction 14. In particular, fulcrum member 40 is generally tubular in contour and includes an axis line coincident with vertical axis direction 14. Fulcrum member 40 in combination with reservoir member 36 provides for reservoir cavity 44 within which a high density fluid such as oil may be inserted and contained. Balancing head 46 is displaceably mounted to housing 24 with tire 12 being releasably mounted to external surface 48 of balancing head 46 as is clearly shown in FIG. 1. As can be seen, external surface 48 of balancing head 46 is formed in a substantially conical contour for adaptation of balancing head 46 to accomodate varying sizes of tire openings 20 formed in tire wheel frame members 22. Inner surface 50 of the balancing head 46 may be similarly formed in conical contour for interface with an upper surface of fulcrum member 40. In this manner, fulcrum member 40 is pivotally mounted to inner surface 50 of balancing head 46.

Balancing head 46 further may include upper appendage 52 having associated through opening 54 passing therethrough. Balancing head through opening 54 passes in vertical direction 14 and includes an axis which is substantially alignable with fulcrum through opening 42 to provide a continuous optical passage through fulcrum member 40 and balancing head 46. In this context, as will become apparent in following paragraphs, housing 24 must include housing upper opening 56 in order to provide a clear optical path through housing 24, fulcrum member 40 and balancing head 46. In this manner, there is provided an optical through passage from housing 24, through fulcrum opening 42 and alignable head opening 54 to allow a substantially vertically directed beam of light to pass.

Balancing system 10 further includes light emission means 58 and 60 which are respectively secured to base frame 28 and balancing head 46. In combination light emission means 58 and 60 pass a first coherent beam of light 62 substantially coincident with vertical axis line 14 and second coherent beam of light 64 displaced from first beam of light 62 responsive to an unbalanced condition of tire 12 about vertical axis line 14. The light emission system as is herein described includes laser system 58 mounted to housing base 28 for emitting light beam 62 substantially coincident with vertical axis direction 14 as is clearly seen in FIG. 1. Laser system 58 may be of a standard type for emitting electromagnetic radiation in the visible spectrum range. One type of laser system successfully utilized is produced and manufactured by Coherent Radiation, Inc., having a designation model #80-05H. Of importance, is coherent beam 62 passing from laser system 58 substantially through and coincident with the axis line of fulcrum through opening 42 and opening 54 of balancing head opening 52. In this manner, when there is no object 12 mounted on balancing system 10, beam 62 passes completely through and external system 10 in a vertical direction defined by axis line 14. Laser system 58 is secured to housing base 28 through laser system bolts 66 or some like securement technique not important to the inventive concept as is herein described, with the exception that once mounted, emitted beam 62 from laser system 58 should pass in aligned fashion in vertical direction 14 through the openings as has hereinbefore been described.

The light emission system further includes beam splitting member 60 mounted in cap member or balancing head 46 within through opening 54 in order to split first beam 62 into at least second beam 64, which would be displaced from first beam 62 when object 12 is inclined with respect to the horizontal plane or plane of base surface 30. Beam splitting member 60 may be insertable within opening 54 of appendage 52 through either force fitting or threaded securement, the mounting of which is not important to the inventive concept as is herein described. Beam splitting member 60 is clearly seen in the schematic diagram shown in FIG. 2. In overall contour, beam splitting member 60 may be formed of a tubular member rigidly alignable with cap member or balancing head 46 within through opening 54. Beam splitting member 60 may be formed of side walls 68 terminating in a pair of opposing end plate planar members 70 and 72. End plates 70 and 72 are formed parallel each to the other and are formed or constructed of a material which is at least partially transparent.

The mode and operation of balancing system 10 can be seen when taken with respect to schematic FIG. 2. Assuming an unbalance in object 12, balancing head 46 which is mounted on fulcrum member 40 is tilted or inclined with respect to vertical axis line 14. Correspondingly, beam splitting member 60 is responsively inclined with respect to axis line 14 causing end plates 70 and 72 to be inclined with respect to a horizontal plane. First beam 62 emitted from laser system 58 passes initially coincident with vertical axis line 14 and passes through lower end plate 72. Beam 62 continues internal to beam splitter 60 and impinges on upper plate 70. A major portion of beam 62 passes through end plate 70 and maintains a coincident path with vertical axis line 14. A secondary portion of light beam 62 is reflected as a first beam reflection 74 from upper plate 70. Due to the inclination of end plate 70 with respect to the horizontal base plane, first beam reflection 74 is inclined with respect to vertical axis 14 as is shown. First beam reflection 74 is then reflected from lower end plate 72 and is reflected therefrom as second beam of light 64 passing through upper end plate 70. As has been found, second beam of light 64 is of a lower order of visible magnitude than initial or first beam of coherent light 62, but is clearly discernable. Other lower order of magnitude reflection points may also be seen upon inclination of end plates 70 and 72 with respect to the horizontal plane, however, first and second beams of light 62 and 64 are sufficient for balancing of tire or object 12 on balancing system 10.

Balancing system 10 may further include target 76 shown in FIG. 1 which is mounted external to housing 24 for interception of first and second beams of light 62 and 64 responsive to an unbalanced condition found in object 12. Target 76 may include indicia 78 formed in a circular contour or some like manner in order to provide the user with an indication of the unbalance found within the system. Beams 62 and 64 impinge on target 76 and provide displaced points of light 80 and 82 which are visibly discernable and the displacement of which define the amount of unbalance found in object 12. Weights may be added to object 12 at various points until beams 62 and 64 are formed into a coincident point of light 80 on target 76.

In an embodiment of the invention, prism 84 as shown in FIG. 2, may be utilized to reflect beams 62 and 64 into prism reflected beams 64' and 62' for impingement on target 76' which may be mounted vertically on a wall or some like structure frame. The mounting of target 76' in this manner allows possibly easier visual assessment by the user. Target 76' may further include indicia 78'. As was the case in the preferred embodiment of the invention, beams 62' and 64' impinge on target 76' to provide displaced points of light 80' and 82'.

Although this invention has been described in connection with specific forms thereof, it will be appreciated that various modifications other than those discussed above may be resorted to without departing from the spirit or scope of the invention. For example, equivalent elemental structures may be substituted for those specifically shown and described, certain features may be used independently of other features, and in some cases, portions may be reversed, all without departing from the spirit or scope of the invention as defined in the appended claims.

What is claimed is:

1. A balancing system for balancing an object about a vertically directed axis line, comprising:
   (a) housing means adapted to be levelled on a base surface defining a plane substantially normal said vertical axis line;
   (b) balancing head means displaceably mounted to said housing means, said object being releasably mounted to an external surface of said balancing head means; and,
   (c) light emission means fixedly secured to said housing means and said balancing head means for passing at least a first coherent beam of light substantially coincident said vertical axis line in a predetermined direction and a second coherent beam of light angularly displaced from said first beam of light in said predetermined direction responsive to an unbalanced condition of said object about said vertical axis line, said first and second beams of light being substantially coincident each with respect to the other when said object is in a balanced condition with respect to said vertical axis line.

2. The balancing system as recited in claim 1 where said housing means includes:
   (a) a base frame member; and,
   (b) a fulcrum member secured to said base frame member, said fulcrum member extending in said vertical axis direction, said fulcrum member having a through opening passing in said vertical axis direction, said first coherent beam of light passing through said opening of said fulcrum member.

3. The balancing system as recited in claim 2 where said fulcrum member is tubular in contour having an axis line coincident with said vertical axis direction.

4. The balancing system as recited in claim 3 where said fulcrum member is pivotally mounted to an inner surface of said balancing head means.

5. The balancing system as recited in claim 2 where said balancing head means includes a frusto-conical cap member having a through opening passing therethrough in said vertical axis direction.

6. The balancing system as recited in claim 5 where said fulcrum member interfaces in pivotal relation with an inner conical surface of said cap member.

7. The balancing system as recited in claim 5 where said cap member through opening is alignable with said fulcrum member through opening for passage of said first beam of light therethrough.

8. The balancing system as recited in claim 5 where said light emission means includes:
   (a) laser means mounted to said base frame for emitting said first light beam substantially in said vertical axis direction; and,
   (b) beam splitting means mounted in said cap member through opening for splitting said first beam into at least a second beam displaced from said first beam where said object is inclined with respect to said base surface plane.

9. The balancing system as recited in claim 8 where said beam splitting means includes a substantially tubular member rigidly alignable with said cap member through opening.

10. The balancing system as recited in claim 9 where said tubular member includes a pair of opposing end plates, said end plates being at least partially transparent.

11. The balancing system as recited in claim 1 including target means mounted external said housing means for interception of said first and second light beams responsive to said unbalanced condition of said object.

12. The balancing system as recited in claim 1 including:
   (a) prism means mounted external said housing for directing said first and second light beams in a predetermined direction; and,
   (b) target means for intercepting said light beams reflected from said prism means.

* * * * *